United States Patent
TenBrink et al.

(10) Patent No.: US 9,593,770 B2
(45) Date of Patent: Mar. 14, 2017

(54) AUTOMATIC TRANSMISSION SHIFTER WITH SPEED SENSITIVE DAMPING

(71) Applicants: Jay T TenBrink, Goodrich, MI (US); Michael Perecki, Brownstown, MI (US)

(72) Inventors: Jay T TenBrink, Goodrich, MI (US); Michael Perecki, Brownstown, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/686,937

(22) Filed: Apr. 15, 2015

(65) Prior Publication Data
US 2016/0305544 A1    Oct. 20, 2016

(51) Int. Cl.
B60K 20/00 (2006.01)
F16H 61/24 (2006.01)
F16H 59/02 (2006.01)
F16H 59/10 (2006.01)

(52) U.S. Cl.
CPC ......... *F16H 61/24* (2013.01); *F16H 59/0204* (2013.01); *F16H 59/105* (2013.01); *F16H 2059/026* (2013.01); *F16H 2059/0269* (2013.01)

(58) Field of Classification Search
CPC .............................. F16H 59/02; F16H 59/105
USPC ............ 74/473.16, 481, 473.17, 482, 473.32
See application file for complete search history.

(56) References Cited

U.S. PATENT DOCUMENTS

| 5,025,677 A * | 6/1991 | Muller ................. F16H 59/042 180/336 |
| 5,263,385 A * | 11/1993 | Hirata .................... B60K 26/00 188/378 |
| 5,525,768 A * | 6/1996 | Cobb, III .............. F16H 59/105 200/11 G |
| 5,617,760 A | 4/1997 | Woeste et al. |
| 6,347,560 B1 * | 2/2002 | Maezawa ................. G05G 1/30 74/473.16 |

(Continued)

FOREIGN PATENT DOCUMENTS

| DE | 102007005496 A1 | 7/2008 |
| DE | 102007011359 A1 | 9/2008 |
| EP | 2636926 A1 | 9/2013 |

OTHER PUBLICATIONS

International Search Report and Written Opinion dated Jun. 27, 2016 for International Application No. PCT/US2016/027305, International Filing Date Apr. 13, 2016.

*Primary Examiner* — William Kelleher
*Assistant Examiner* — Zakaria Elahmadi
(74) *Attorney, Agent, or Firm* — Ralph E. Smith (57) ABSTRACT

An electronic shifter assembly includes a shift lever and a speed sensitive damping arrangement housed within a base of the assembly. The speed sensitive damping arrangement includes a housing, a shaft coupled to the shift lever, a plurality of stacked plates and a damping substance. The stacked plates are associated with the shaft and a cavity of the housing, where at least one of the stacked plates is keyed to the shaft and at least another one of the stacked plates is keyed to the housing such that rotation of the shaft via the shift lever causes relative movement of the keyed stacked plates. The damping substance is packed into the internal cavity and about the stacked plates such that the damping arrangement provides speed sensitive damping to the shift lever proportional to a speed of movement of the shift lever.

13 Claims, 8 Drawing Sheets

(56) References Cited

U.S. PATENT DOCUMENTS

| | | | |
|---|---|---|---|
| 6,530,293 B1* | 3/2003 | Ruckert | F16H 59/105 324/207.23 |
| 7,458,438 B2* | 12/2008 | Nishino | B60K 20/04 180/305 |
| 7,587,958 B2 | 9/2009 | Gorman et al. | |
| 8,746,108 B2 | 6/2014 | Choi et al. | |
| 2002/0073796 A1* | 6/2002 | Ruckert | F16H 59/042 74/473.33 |
| 2002/0153235 A1* | 10/2002 | Watada | H01H 11/06 200/61.88 |
| 2004/0074329 A1* | 4/2004 | Thoreson | F16H 59/0208 74/473.34 |
| 2009/0217781 A1* | 9/2009 | Kusayama | F16H 59/02 74/473.15 |
| 2011/0005344 A1* | 1/2011 | Haevescher | F16H 59/02 74/473.12 |
| 2011/0056318 A1* | 3/2011 | Rake | F16H 59/0278 74/473.12 |
| 2011/0083526 A1* | 4/2011 | Hahn | F16C 1/262 74/502.4 |
| 2011/0296943 A1* | 12/2011 | Peukert | F16H 59/02 74/473.12 |
| 2013/0145889 A1* | 6/2013 | Vermeersch | F16H 59/02 74/473.36 |
| 2016/0017983 A1* | 1/2016 | Levesque | F16H 59/0204 74/473.25 |

* cited by examiner

AUTOMATIC TRANSMISSION SHIFTER WITH SPEED SENSITIVE DAMPING

FIELD

The present application relates generally to a transmission shifter and, more particularly, to an electronic transmission shifter with a speed sensitive damping arrangement for a shift-by-wire automatic transmission.

BACKGROUND

Today's vehicles are often equipped with electronic shifters ("e-shifters") to place the vehicle's automatic transmission into a desired gear state. Electronic shifters can replace the traditional console mounted P-R-N-D-L mechanical shift lever and are typically implemented as levers, which can be pushed up/down or sideways to effect gear changes. The typical mono-stable lever type electronic shifter returns to its original or home position after it has been manipulated by the driver. A more recent development is to have a multi-position stable or poly-stable e-shifter that retains an actuator setting that represents a driver requested transmission gear state. With the poly-stable e-shifter, the shift lever can retain a manipulated position of the shift lever and, as such, may be preferred by drivers. The shift-by-wire transmissions associated with these e-shifters do not include a mechanical cable or link to the e-shifter nor the detent member that is incorporated within a mechanically shifted transmission, which provides damping to the shift lever mechanical system. Thus, while conventional e-shifter arrangements for motor vehicles work for their intended purpose, there remains a need for improvement in the relevant art.

SUMMARY

In accordance with an aspect of the invention, an electronic shifter assembly for a shift-by-wire transmission is provided. In one exemplary implementation, the shifter assembly includes a shift lever and a speed sensitive damping arrangement. The shift lever includes a coupling member pivotably coupling the shift lever to a base of the electronic shifter assembly. The speed sensitive damping arrangement is housed within the base and includes a housing member, a shaft member, a plurality of stacked plates and a damping substance. The housing member is associated with the base and defines an internal cavity, and the shaft member extends from the coupling member and is received in the internal cavity. The plurality of stacked plates is associated with the shaft member and the internal cavity, where at least one of the stacked plates is keyed to the shaft member and at least another one of the stacked plates is keyed to the housing member such that rotation of the shaft member via movement of the shift lever causes relative movement of the at least one and the at least another one of the stacked plates. The damping substance is packed into the internal cavity and about the plurality of stacked plates. The damping arrangement is configured to provide speed sensitive damping to the shift lever such that a resistance to movement of the shift lever provided by the damping arrangement is proportional to a speed of movement of the shift lever.

In one exemplary implementation, the damping substance comprises high shear damping grease packed into the cavity about and between each of the stacked plates of the plurality of stacked plates.

In one exemplary implementation, the housing member is positioned in a receptacle defined by the base, and the housing member is rotationally fixed by the receptacle while also being vertically movable relative to the receptacle. In this implementation, movement of the shift lever along a first axis associated with selecting drive and reverse gears rotates the shaft member relative to the housing member; and movement of the shift lever along a second axis perpendicular to the first axis slidably moves the housing member in a vertical plane relative to the receptacle. The plurality of stacked plates along with at least a portion of the shaft member may be positioned in the internal cavity of the housing member.

In one exemplary implementation, each plate of the plurality of stacked plates includes an annular plate having a central aperture. Each annular plate is positioned on the shaft member via the respective apertures such that the plates of the plurality of stacked plates are positioned adjacent to each other in an axially stacked arrangement on the shaft member. Each of the stacked plates may include a spacer configured to engage an adjacent stacked plate of the plurality of stacked plates when positioned on the shaft member thereby providing a gap between the plurality of stacked plates in the axially stacked arrangement for receiving the damping substance.

In one exemplary implementation, the housing member defines a projection extending in the internal cavity and the shaft member defines a shaft internal cavity sized and shaped to correspond to an exterior size and shape of the projection. In this implementation, the projection is received in the shaft internal cavity when the plurality of stacked plates and at least a portion of the shaft member are positioned in the internal cavity of the housing member. In this implementation, the damping substance may also be placed on at least one of the projection and a wall of the shaft internal cavity so as to be between the projection and the wall of the shaft internal cavity when the projection is positioned therein.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
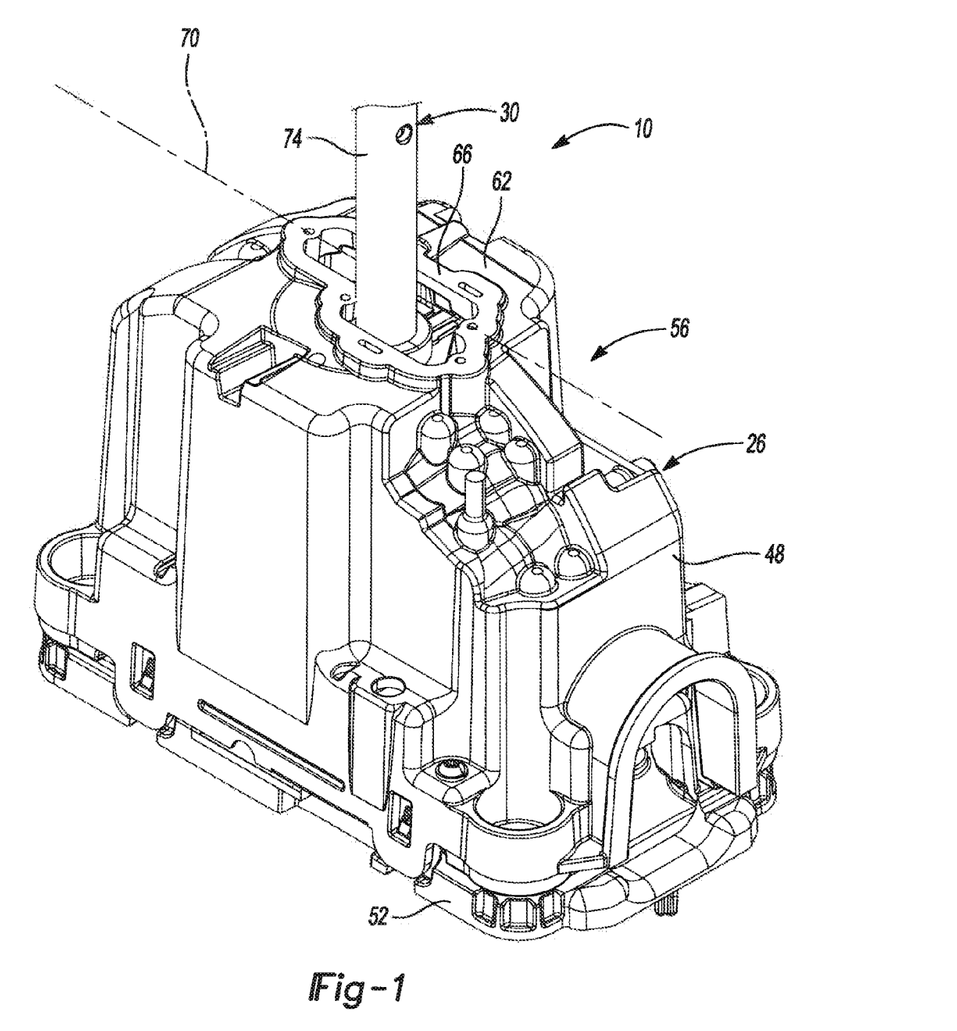
FIG. 1 is a perspective view of an exemplary poly-stable electronic shifter assembly according to the principles of the present disclosure.

With initial reference to FIG. 1, an exemplary poly-stable electronic shifter assembly is shown and generally identified at reference numeral 10. As discussed above, one of the benefits of a poly-stable electronic shifter includes an ability for a shift lever to remain in a position it is placed by a driver for selecting a transmission gear. Typical transmission gears to be selected are park, reverse, neutral and drive (PRND).

As also discussed above, electronic shifters associated with shift-by-wire transmissions do not include a mechanical cable or link to the transmission, as would be the case for a mechanical shifter associated with a mechanically shifted transmission. The cable and shift systems of the mechanically shifted transmissions typically include a detent system incorporated into the transmission, which provides damping to the system. These conventional cable and shift systems can also have the cable moving through grease within a cable housing or sleeve, which also provides damping to movement of the shift lever.

Accordingly, a poly-stable electronic shifter assembly 10 having a speed sensitive damping arrangement for use with a shift-by-wire automatic transmission is provided in accordance with various aspects of the present application. In one exemplary implementation, the speed sensitive damping arrangement provides increased damping or resistance to movement of the shift lever proportional to a speed of movement of the shift lever. In one exemplary implementation, the speed sensitive damping arrangement includes a plurality of stacked plates packed with a viscous material or damping substance/material, such as damping grease, where movement of the shift lever causes relative movement of the stacked plates and the damping grease provides resistance to such relative movement. In one exemplary implementation, the damping grease is a high shear grease.

In one exemplary implementation, the speed sensitive damping arrangement cooperates with an internal mechanical detent system of the poly-stable electronic shifter assembly 10. As will be discussed in greater detail below, the speed sensitive damping arrangement cooperates with the mechanical detent system so as to provide internal damping with a smooth, controlled shifter feel while also working to aid in preventing overshoot of a desired gear. In this exemplary implementation, the speed sensitive damping arrangement provides a shifter feel comparable to the shifter feel of a mechanical shift system associated with a mechanically shifted transmission, with the speed sensitive damping making it easier for a driver to select a desired transmission gear while minimizing potential overshoot.

With continuing reference to FIG. 1 and additional reference to FIGS. 2-4 and 6, the poly-stable electronic shifter assembly 10 includes, in one exemplary implementation, a base 26, a shift lever assembly 30 pivotably coupled to the base 26, a dual mechanical detent system 38 housed within base 26, and a speed sensitive damping arrangement or system 42 (e.g., FIG. 2) also housed within base 26. The base 26 is configured to be fixedly attached to a vehicle, such as in association with a center console of the vehicle. It should be appreciated, however, that the base 26 along with the components of poly-stable electronic shifter assembly 10 can be attached or positioned in various interior locations of the vehicle. The base 26 is formed from any suitable materials, such as plastic, and can be provided in a one-piece construction or constructed of multiple components secured together, as will be discussed in greater detail below.

In the exemplary implementation illustrated, the base 26 is provided in a two-piece construction having an upper base member 48 and a lower base member 52. The upper and lower base members 48, 52, when assembled together, form an outer base housing 56 (FIG. 1). It should be appreciated, however, that base 26 could also be provided with a separate outer housing formed from one or more pieces or members. The upper base member 48 includes an upper end 62 having or defining a gate guide 66 configured to aid in guiding the shift lever assembly 30 along a travel path or axis 70 (e.g., FIG. 1) between and among park (P), reverse (R), neutral (N) and drive (D) (PRND) gear selection locations.

The shift lever assembly 30 includes a shift lever 74, a shift knob (not specifically shown) and a shift lever pivot base 82. The shift lever 74 includes a first or upper end configured to be coupled to the shift knob and a second or lower end 90 fixed to the shift lever pivot base 82. The shift lever pivot base 82 includes a body 94 defining a central bore 98 and first and second body members 102, 106 extending in opposite directions from central bore 98. In the exemplary implementation illustrated, the first and second body members 102, 106 extend in directions substantially in-line or substantially parallel to the travel axis 70 of the shift lever assembly 30, which will be discussed in greater detail below.

Figure 6:
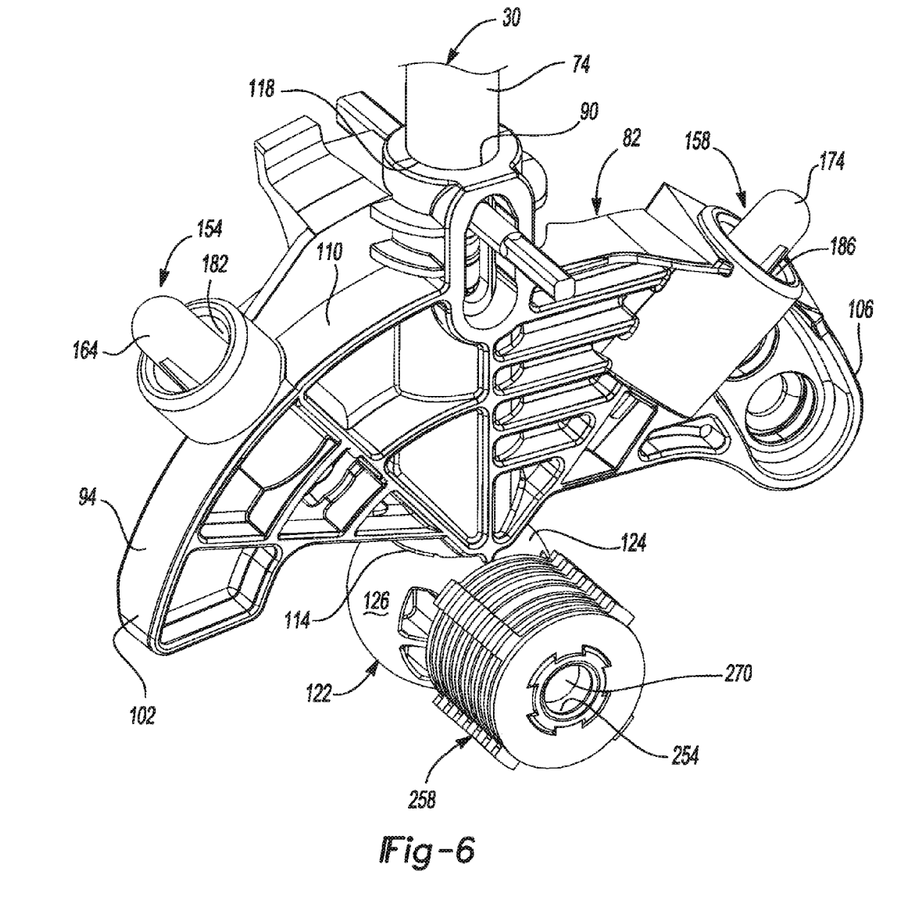
FIG. 6 is a perspective view of a pivot base of an exemplary shift lever assembly showing an exemplary stacked plate arrangement coupled thereto according to the principles of the present disclosure.

The body 94 includes an upper end or surface 110 and a lower end or surface 114, as shown for example in FIG. 6. The upper surface 110 defines an opening 118 of central bore 98 and the lower surface 114 defines a coupling member 122. The lower end 90 of shift lever 74 is received in opening 118 and fixed to central bore 98. In one exemplary aspect, the coupling member 122 includes a male coupling member, such as a ball pivot member 124, with at least a portion of its outer surface 126 (e.g., FIG. 6) being spherical or substantially spherical. The coupling member 122 cooperates with a receptacle in lower base member 52 to pivotably couple the shift lever assembly 30 to base 26, as will be discussed in greater detail below.

The shift lever assembly 30 is pivotable as a unit relative to base 26 and gate guide 66 along travel axis 70. In other words, pivotal movement of the shift lever 74 correspondingly moves the shift lever pivot base 82 therewith. The shift lever assembly 30 is also pivotable along a lateral or cross-car axis 128 (FIG. 2) perpendicular to or substantially perpendicular to travel axis 70 to place the shift lever assembly 30 in, for example, a manual-automatic gear selection mode. For purposes of this discussion, however, the manual-automatic positions will not be described in greater detail herein.

With continuing reference to FIGS. 1-4 and 6, the dual mechanical detent system 38 of the poly-stable electronic shifter assembly 10 will now be discussed in greater detail. The dual mechanical detent system 38 includes, in one exemplary implementation, first and second mechanical detent systems 154, 158. The first mechanical detent system 154 includes a first detent plunger 164 and a first detent cam member 168. Similarly, the second mechanical detent system 158 includes a second detent plunger 174 and a second cam member 178. The first and second detent plungers 164, 174 are configured to engage and cooperate with the respective first and second cam members 168, 178, as will be discussed in greater detail below. In the exemplary implementation illustrated in the various figures, the first and second detent plungers 164, 174 are positioned in first and second bores 182, 186 defined by the respective first and second body members 102, 106 of shift lever pivot base 82, as shown for example in FIGS. 2 and 6.

The first and second detent plungers 164, 174 are biased into engagement with the respective cam members 168, 178, such as with a biasing member. In the exemplary implementation illustrated, the first and second cam members 168, 178 are each attached to the base 26 such that the shift lever assembly 30 and first and second detent plungers 164, 174 associated therewith move relative to the cam members 168, 178 with the detent plungers in moving engagement therewith, as discussed below in greater detail.

The first and second cam members 168, 178 each define a cam profile or surface 196 formed by a plurality of grooves/valleys or detent positions 202 corresponding to various PRND gear selection locations in which the shift lever assembly 30 can be shifted to place the transmission in a desired gear. Each detent groove or position 202 is separated by a ridge/peak or protrusion 206 positioned therebetween, as shown for example in FIG. 3 with reference to FIG. 6. As the shift lever assembly 30 is pivoted from the park gear selection location along travel axis 70 to the drive gear selection location, the first detent plunger 164 engagingly follows the cam member profile 196 of first cam member 168, and the second detent plunger 174 simultaneously engagingly follows the cam member profile 196 of the second cam member 178.

It should be appreciated that while the dual mechanical detent system 38 is illustrated, the electronic poly-stable shift lever assembly 10 could also utilize only one detent plunger and corresponding cam member (e.g., a single mechanical detent system). A further discussion of the exemplary dual mechanical detent system 38 and its operation can be found in commonly owned, co-pending U.S. patent application Ser. No. 14/511,477 filed Oct. 10, 2014, the entirely of which is incorporated by reference herein.

With additional reference to FIGS. 5 and 7A-7C and continuing reference to FIGS. 1-4 and 6, the structure and operation of the speed sensitive damping arrangement 42 will now be discussed. In the exemplary implementation illustrated, the speed sensitive damping arrangement 42 includes an assembly having a housing member 250, a shaft member 254, a stacked plate arrangement 258 and a viscous damping substance 262.

As will be discussed in greater detail below, the speed sensitive damping arrangement 42 is configured to provide speed sensitive damping to movement of the shift lever assembly 30 as the one or more detent plungers 164 and/or 174 travel over the cam profiles 196. Briefly, however, the shaft member 254 with the stacked plate arrangement 258 positioned thereon are received in a cavity of the housing member 250, which is fixed from rotation in the base 26. Rotation or pivotal movement of the shift lever 74 along axis 70 rotates certain of the plates that are keyed to the shaft member 254 relative to other of the plates that are keyed to the housing member 250 and against the damping substance 262 that is packed into the housing member 250 and about the stacked plate arrangement 258. The viscosity of the damping substance 262 and the number and surface characteristics of the plates can be varied to achieve the desired speed sensitive damping, as will also be discussed below.

In one exemplary implementation, the shaft member 254 is connected to the ball pivot member 124 in a non-rotatable manner for common movement therewith. The shaft member 254 can be integrally formed with the ball pivot member 124 or can be assembled thereto. In either instance, the shaft member 254 extends laterally from the ball pivot member 124, as shown for example in FIGS. 2, 4 and 6. The shaft member 254 includes, in one exemplary implementation, a hollow interior or cavity 270 and a keyed exterior 274 (e.g., FIG. 4). The keyed exterior 274 includes, in one exemplary form, one or more channels extending axially along the cylindrical or substantially cylindrical exterior form of shaft member 254.

Figure 2:
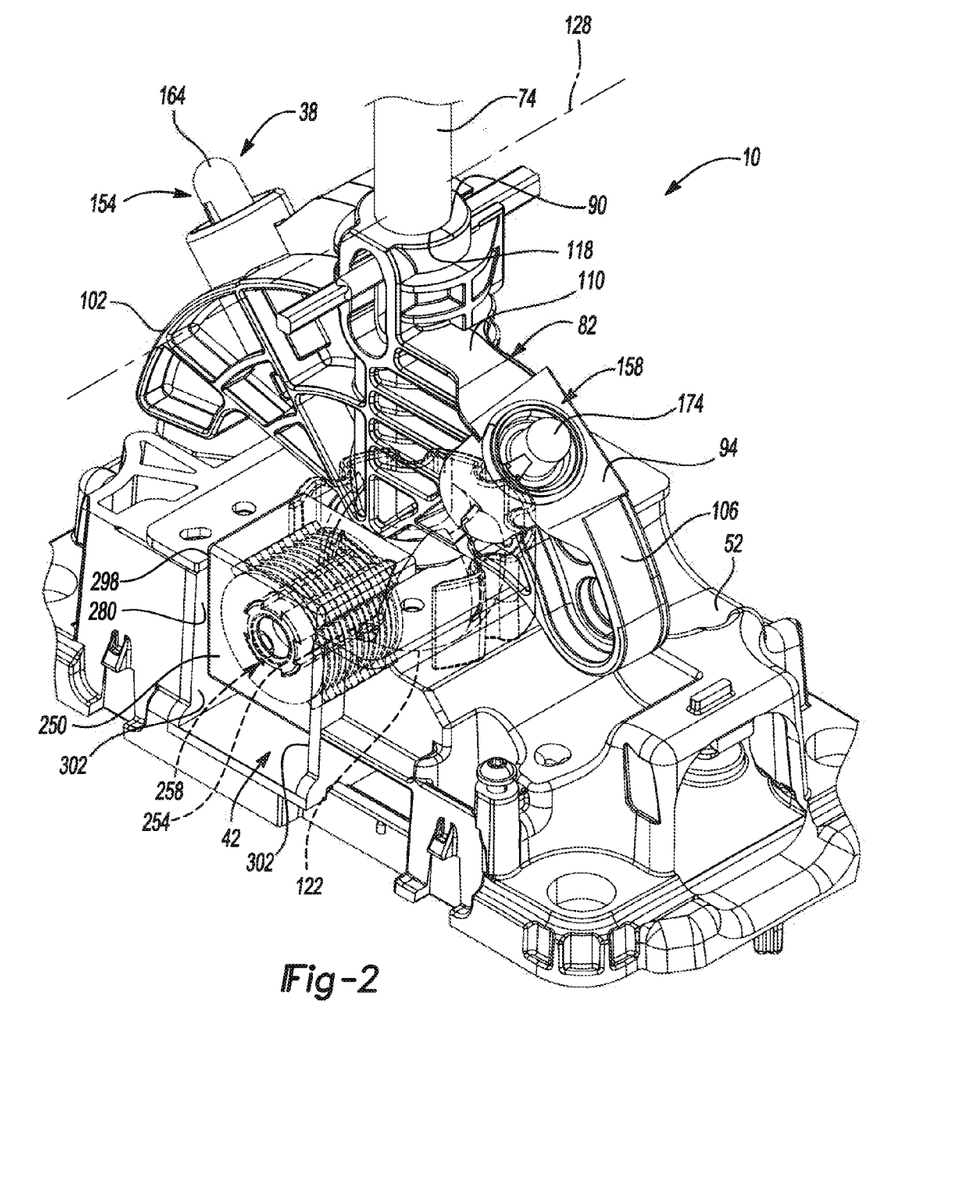
FIG. 2 is a perspective view of the poly-stable electronic shifter assembly of FIG. 1 with an upper base member removed and showing a speed sensitive damping arrangement according to the principles of the present disclosure.
Figure 3:
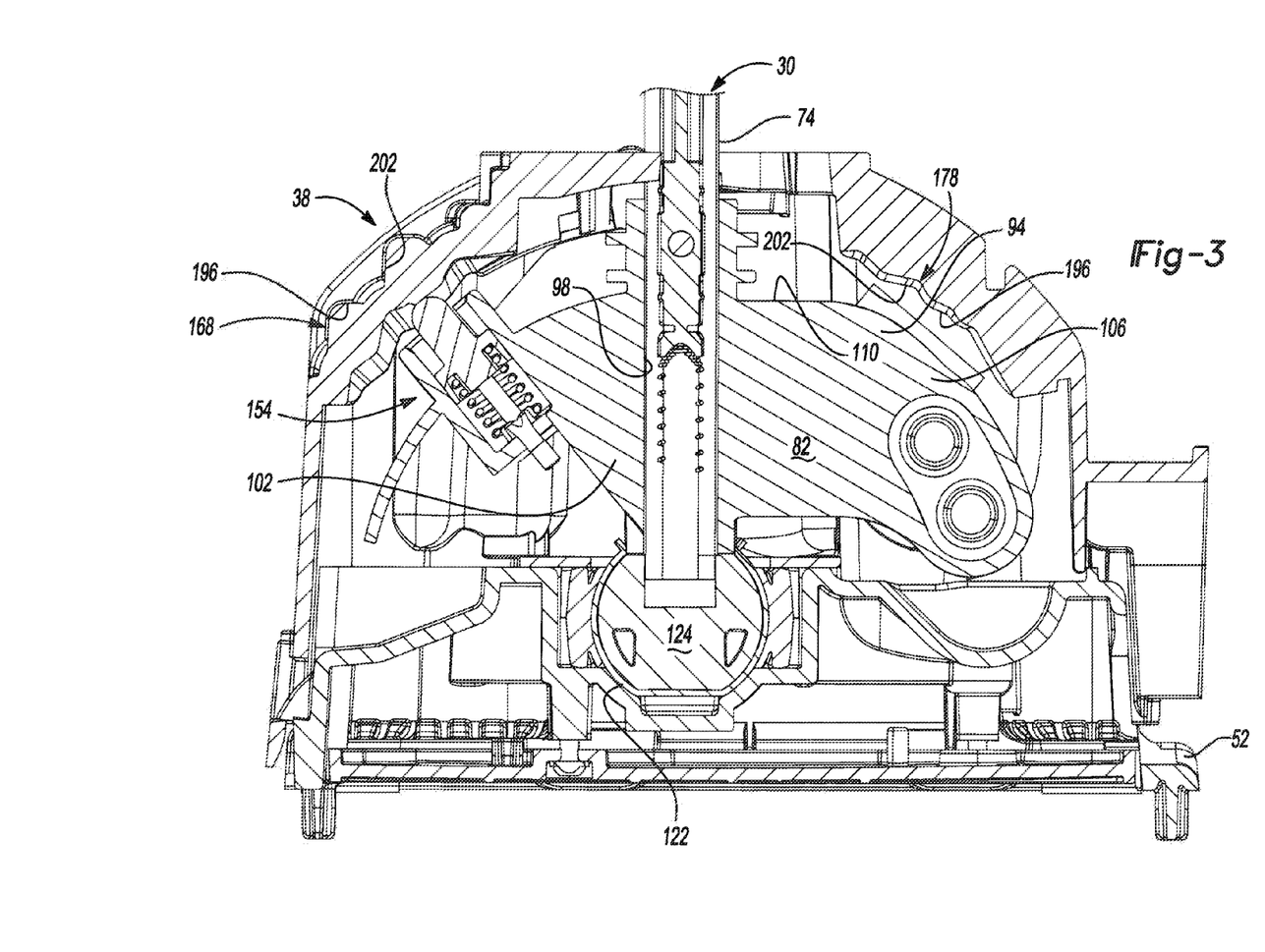
FIG. 3 is a partial sectional view of the poly-stable electronic shifter assembly illustrating features of an exemplary dual mechanical detent system and pivot coupling according to the principles of the present disclosure.

The housing member 250, in one exemplary implementation, is a quadrilateral having at least two parallel sides that are configured to be slidably received in a correspondingly dimensioned receptacle or channel 280 in lower base member 52, as shown for example in FIG. 2. In the exemplary implementation illustrated, the housing member 250 is in the form of a cube defining a hollow cavity or interior 284 having an internal wall 288 with an internal key 292 formed therein, as shown for example in FIG. 7A. The housing member 250 includes two parallel sides 298 configured to be slidably received in the receptacle 280, which is formed by opposed walls 302. The sides 298 are received in sliding engagement with the walls 302 thereby allowing the housing member 250 to move vertically (i.e., up and down) relative to the walls 302, but preventing rotation of the housing member 250 and movement of the housing member 250 in the direction of longitudinal axis 70.

Figure 4:
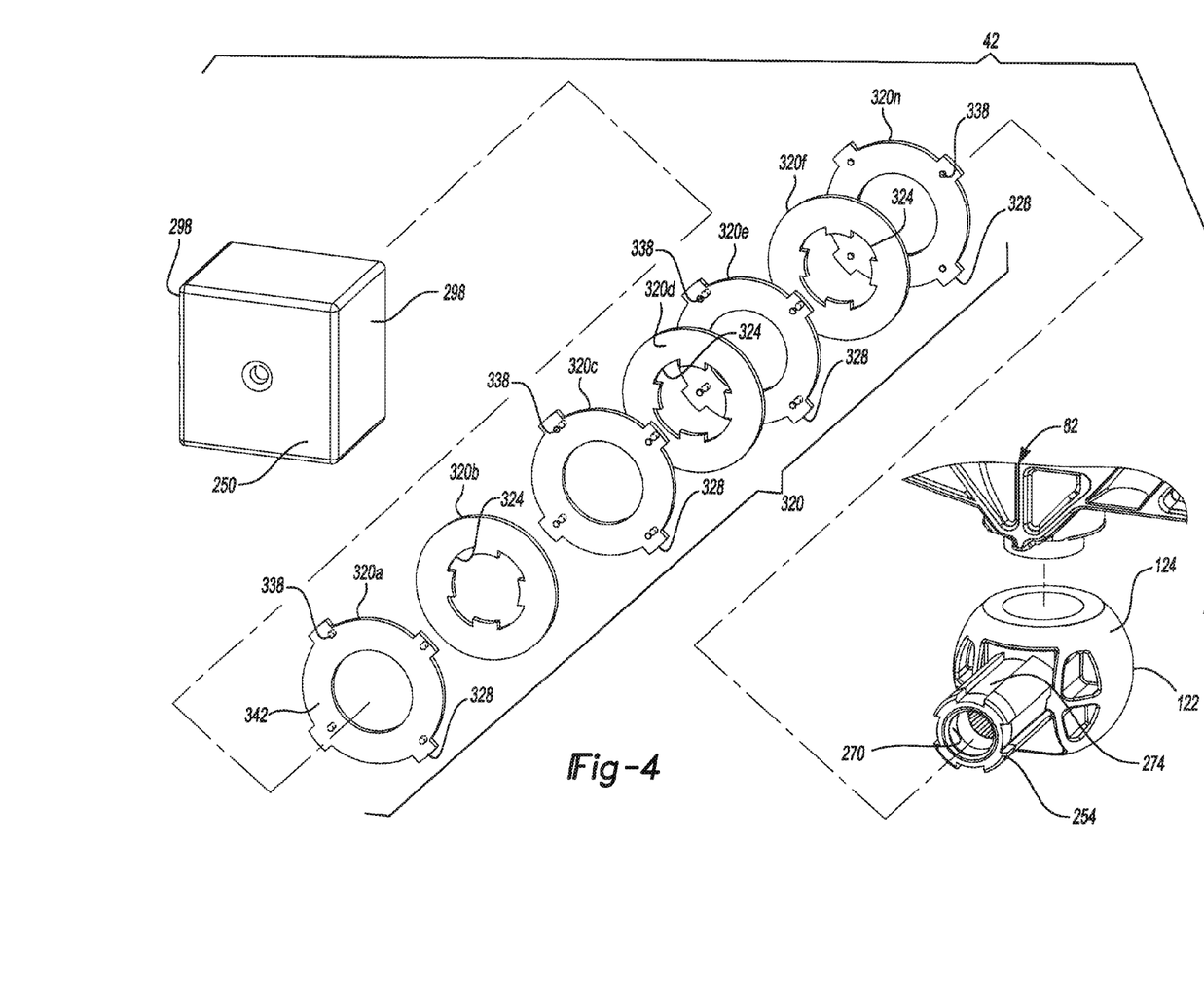
FIG. 4 is a partial assembly view of components of the speed sensitive damping arrangement according to the principles of the present disclosure.
Figure 5:
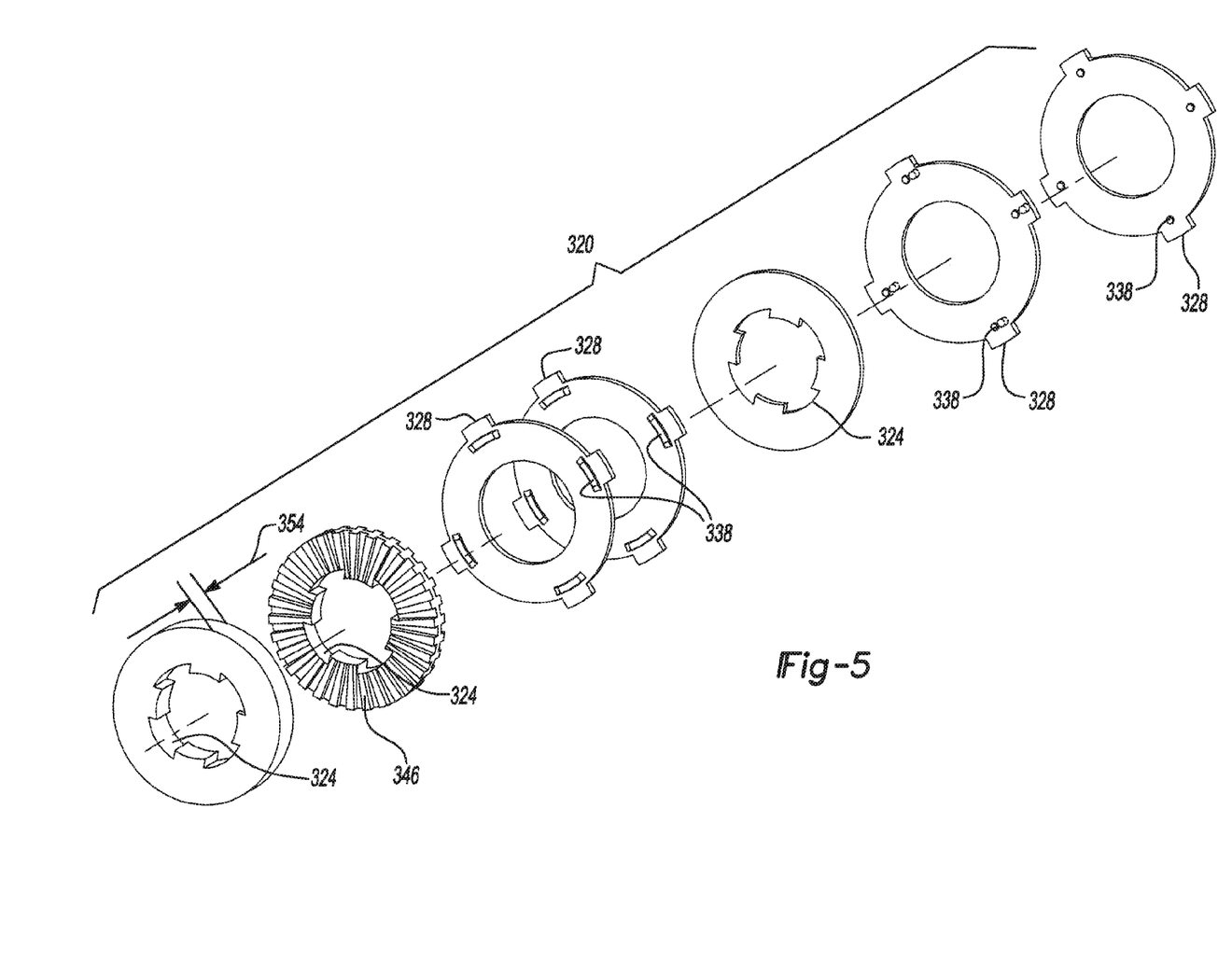
FIG. 5 is an assembly view of an exemplary stacked plate arrangement of the speed sensitive damping arrangement according to the principles of the present disclosure.

The stacked plate arrangement 258 includes a plurality of annular discs or plates 320a, 320b . . . 320n (collectively, plates 320) assembled in a stacked configuration on shaft member 254, as shown for example in FIGS. 4-6. As will be discussed in greater detail below, at least one of the annular plates 320, e.g., plate 320b, has an interior key 324 complimentary to the keyed exterior 274 of shaft member 254 such that plate 320b slides axially on the shaft member 254 but is fixed for rotation therewith; and at least another one of the annular plates 320, e.g., plate 320a, has an exterior key 328 complimentary to the internal key 292 of the housing member 250 such that plate 320a slides axially in cavity 284 but is rotationally fixed thereto.

For example, and with particular reference to FIGS. 4 and 5, various different configurations of the plates 320 can be utilized to obtain different damping amounts and/or configurations. One example shown in FIG. 4 includes an arrangement where the plates 320 have an alternating key configuration between the exterior key 328 and the interior key 324, or vice versa. FIG. 5 shows another example where multiple adjacent plates 320 of the stacked plate configuration 258 include the same external key 328 and/or internal key 324.

In addition to the key arrangements 324, 328, the plates 320 include various different configurations of spacers 338, including an absence of any spacer 338. The plates 320 can also include various different surface configurations, such as a smooth or substantially smooth exterior surface 342 (e.g., FIG. 4) and a non-smooth exterior surface, such as a ribbed or splined surface 346 (e.g., FIG. 5). The plates can further include different thickness 354 as measured in the longitudinal or axial direction of shaft member 254 and shown in FIG. 5.

Varying the exterior surface 342, thickness 354 and space between the plates 320 via spacers 338 changes the interaction with and/or amount of damping substance 262 between and associated with the plates 320. Similarly, increasing the number of plates 320 increases the friction, and thus damping, associated with moving the plates 320 relative to each other and the damping substance 262 based on movement of the shift lever 74. Increasing or decreasing the shear resistance of the damping substance also increases or decreases, respectively, the damping ability of the damping substance, as discussed below.

The viscous damping substance 262 is, in an exemplary implementation, high shear damping grease. As will be appreciated by those skilled in the art, a distinguishing difference between standard greases and damping greases is shear resistance. High shear damping greases are generally formulated with viscous, i.e., high molecular weight synthetic oils, which give them a much higher internal shear resistance than standard greases. Unlike standard greases, it takes a degree of force to move an object through a damping grease. This internal shear resistance enables damping grease to damp or control motion, noting that the higher the shear resistance the greater the degree of damping. When the damping grease is applied to mating surfaces, such as for example adjacent exterior surfaces 342 of the plates 320, it will require a greater degree of force to move those surfaces relative to or in opposition to one another.

Figure 7A:
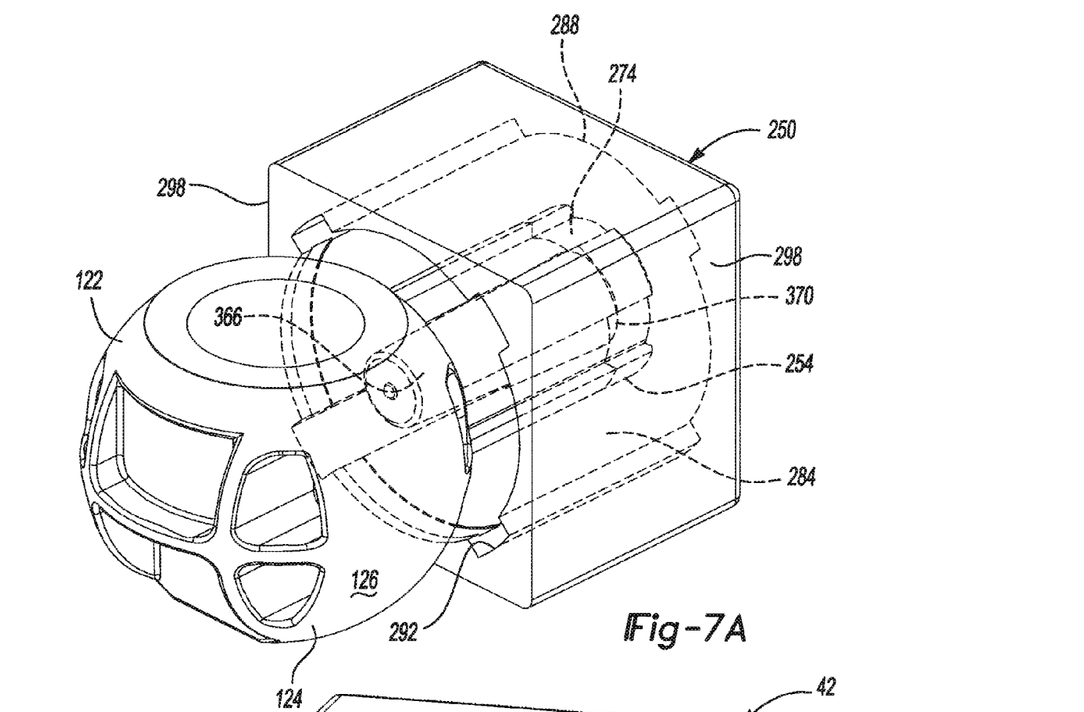
FIG. 7A is a partial perspective view of the speed sensitive damping arrangement illustrating a housing member receiving a shaft member of the pivot base in a cavity thereof according to the principles of the present disclosure.
Figure 7B:
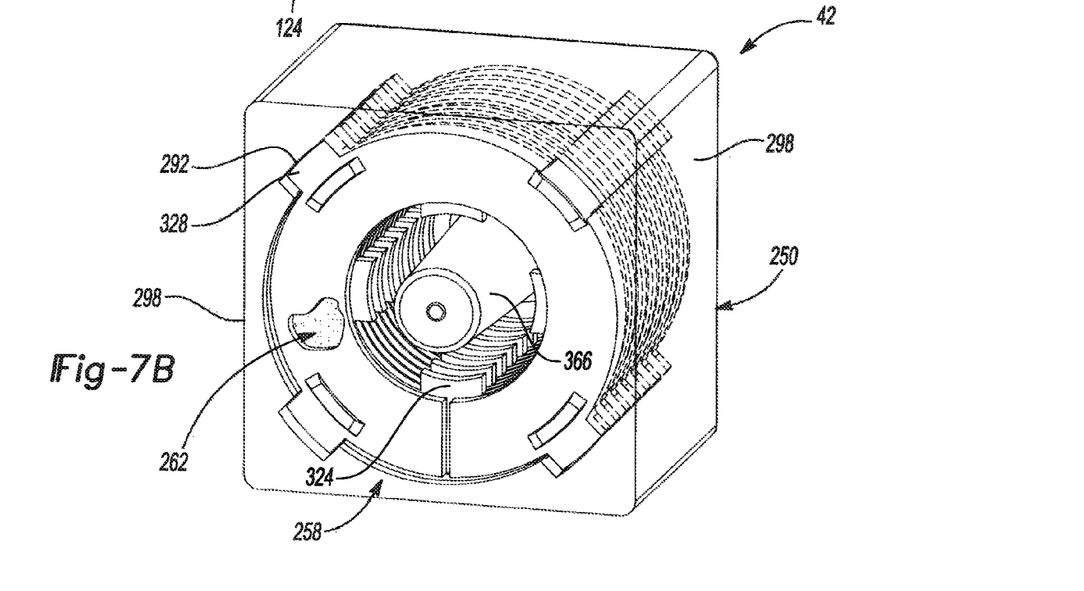
FIG. 7B is a partial perspective view of the speed sensitive damping arrangement illustrating the housing member having the stacked plate arrangement assembled therein according to the principles of the present disclosure.
Figure 7C:
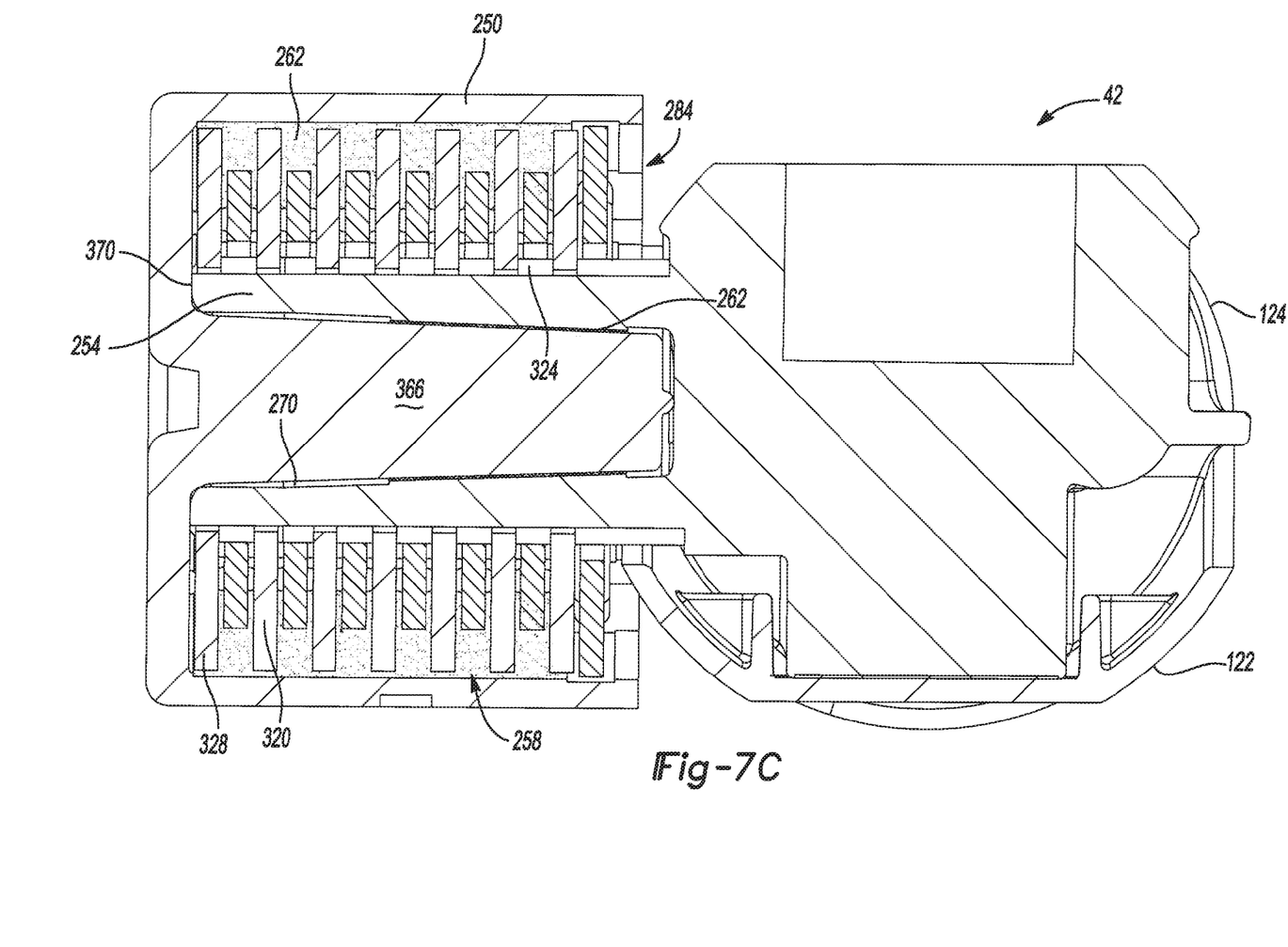
FIG. 7C is a partial sectional view of the speed sensitive damping arrangement illustrating the shaft member, housing member, stacked plate arrangement and a damping substance in an assembled configuration according to the principles of the present disclosure.

The stacked plate arrangement 258, as depicted in FIG. 4, is shown in an assembled condition on shaft member 254 in FIGS. 6 and 7B-7C. As discussed above, each plate 320 with the internal key 324 is fixed for rotation with the shaft member 254 via keyed exterior 274. As shaft member 254 is fixed to ball pivot member 124, pivoting the shift lever 74 rotates shaft member 254 and thus the plates 320 keyed thereto. Each of the plates 320 with the external key 328, which are interposed between plates 320 with the internal key 324 in one illustrated example, are keyed to the internal key 292 of housing member 250 when member 250 is assembled onto shaft member 254 and over and about the stacked plate arrangement 258. As will be discussed in greater detail below, when shift lever 74 is pivoted as discussed immediately above, the internally keyed plates 320 rotate with the shaft member 254 and relative to the externally keyed plates 320, which are rotationally fixed to the housing member 250, which is rotationally fixed to the shifter assembly base 26 in the receptacle 280 thereof.

In one exemplary implementation, the hollow interior 270 of shaft member 254 receives a central shaft member 366 of housing member 250 therein upon assembling housing member 250 to the shaft member 254, as shown for example in FIGS. 7A-7C. In one exemplary aspect, the central shaft member 366 includes a conically shaped exterior with a decreasing diameter from a first end at an internal rear wall 370 of cavity 284 to an opposed free end thereof, and the hollow interior 270 of shaft member 254 includes a complimentary size and shape, as best shown for example in FIG. 7C. In one exemplary aspect of this implementation, the exterior of the central shaft member 366 and/or an interior wall of the hollow interior 270 receives an application of the damping grease 262 such that movement of the shaft member 254 relative to the housing member 250 also requires shearing the damping grease at the interface between the central shaft member 366 and the shaft member 254.

In operation, the damping grease 262 is applied to the stacked plate arrangement 258 and inside the cavity of housing member 250 when the stacked plate arrangement is positioned therein along with shaft member 254. In one exemplary implementation, the damping grease 262 is applied to the exterior side surfaces 342 of each plate 320 such that there is damping grease 262 interposed between each adjacent plate 320 of the stacked plate arrangement 258 on shaft member 254. Once shaft member 254 with the stacked plate arrangement 258 positioned thereon is assembled into cavity 284 of housing member 250, the damping grease 262 is optionally also packed into cavity 284 filling or substantially filling any remaining void space therein.

Shift lever assembly 30 with the speed sensitive damping arrangement 42 assembled thereon, is associated/coupled with base 26 such that the pivot ball member 124 is pivotably positioned in or coupled to base 26 and the housing member 250 is slidably received between opposed walls 302 of receptacle 280, as shown in FIG. 2. With this shifter assembly 10, the speed sensitive damping arrangement 42 provides tunable speed sensitive damping to pivotal movement of the shift lever 74 along travel axis 70. In addition, the receptacle 280 provides for fixing housing member 250 from rotating while allowing slidable movement parallel to the opposed walls 302. Such movement is required, for example, when shift lever 74 is pivoted laterally or cross-car along lateral axis 128 to enable a sport mode and/or manual-automatic shift mode. For example, pivotably moving the shift lever 74 in this manner raises and lowers the housing member 250 relative to the receptacle 280.

As discussed above, such speed sensitive damping is provided by the combination of the stacked plate arrangement 258 and the relative movement of the plates 320 associated therewith combined with the damping grease interposed between the plates 320 and packed into cavity 284. The number of plates 320 can be increased or decreased to increase or decrease the amount of damping, respectively, thereby providing an easily tunable speed sensitive damping arrangement that is proportional to the speed of movement of the shift lever 74. The speed sensitive damping arrangement 42 provides very low resistance at low or zero speed (e.g., positions between gears) making it easy for the operator to initiate a gear change while also providing high resistance at higher speeds thereby providing a quality feel to the operator with detent energy being dissipated in the damping arrangement and not the operator's hand.

In one exemplary aspect, the speed sensitive damping arrangement 42 in combination with the detent system dampens movement of the shift lever making it easier for the operator to find the desired detent position (i.e., gear position) by eliminating or substantially eliminating the coasting of the lever 74 past the next detent position after the desired gear. Such speed sensitive damping provides for a smoother and more controlled shift lever movement experience, as well as make it easier for a user to select a desired gear selection location while minimizing overshoot.

It will be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An electronic shifter assembly for a shift-by-wire transmission, the shifter assembly comprising:
   a shift lever including a coupling member pivotably coupling the shift lever to a base of the electronic shifter assembly;
   a speed sensitive damping arrangement housed within the base, the damping arrangement including:
      a housing member associated with the base and defining an internal cavity;
      a shaft member extending from the coupling member and received in the internal cavity;
      a plurality of stacked plates associated with the shaft member and the internal cavity, at least one of the stacked plates keyed to the shaft member and at least another one of the stacked plates keyed to the housing member such that rotation of the shaft member via movement of the shift lever causes relative movement of the at least one and the at least another one of the stacked plates; and
      a high shear damping grease packed into the internal cavity and about the plurality of stacked plates thereby providing resistance to movement of the at least one of the stacked plates keyed to the shaft member;
   wherein the damping arrangement is configured to provide speed sensitive damping to the shift lever such that a resistance to movement of the shift lever provided by the damping arrangement increases with increasing speed of movement of the shift lever.

2. The shift lever assembly of claim 1, wherein the housing member is positioned in a receptacle defined by the base, the housing member being rotationally fixed by the receptacle while also being vertically movable relative to the receptacle.

3. An electronic shifter assembly for a shift-by-wire transmission, the shifter assembly comprising:
   a shift lever including a coupling member pivotably coupling the shift lever to a base of the electronic shifter assembly;
   a speed sensitive damping arrangement housed within the base, the damping arrangement including:
      a housing member positioned in a receptacle defined by the base and defining an internal cavity, the housing member being rotationally fixed by the receptacle while also being vertically movable relative to the receptacle;
      a shaft member extending from the coupling member and received in the internal cavity;
      a plurality of stacked plates associated with the shaft member and the internal cavity, at least one of the stacked plates keyed to the shaft member and at least another one of the stacked plates keyed to the housing member such that rotation of the shaft member via movement of the shift lever causes relative movement of the at least one and the at least another one of the stacked plates; and
      a high shear damping grease packed into the internal cavity and about the plurality of stacked plates;
   wherein the damping arrangement is configured to provide speed sensitive damping to the shift lever such that a resistance to movement of the shift lever provided by the damping arrangement increases with increasing speed of movement of the shift lever;
   wherein movement of the shift lever along a first axis associated with selecting drive and reverse gears rotates the shaft member relative to the housing member; and
   wherein movement of the shift lever along a second axis perpendicular to the first axis slidably moves the housing member relative to the receptacle in a vertical plane.

4. The shift lever assembly of claim 1, wherein each plate of the plurality of stacked plates comprises an annular plate having a central aperture, each annular plate positioned on the shaft member via the respective apertures such that the plurality of stacked plates are positioned adjacent to each other in an axially stacked arrangement on the shaft member.

5. The shift lever assembly of claim 4, wherein each stacked plate of the plurality of stacked plates includes a spacer configured to engage an adjacent stacked plate of the plurality of stacked plates when positioned on the shaft member thereby providing a gap between the plurality of stacked plates in the axially stacked arrangement for receiving the damping substance.

6. The shift lever assembly of claim 4, wherein each of the at least one of the stacked plates keyed to the shaft member includes an internal key associated with the central aperture and a channel defined by the shaft member; and
   wherein each of the at least one of the another stacked plates keyed to the housing member includes an external key associated with an outer perimeter of the at least another one of the stacked plates and a channel defined by the internal cavity.

7. The shift lever assembly of claim 4, wherein the plurality of stacked plates in the axially stacked arrangement along with at least a portion of the shaft member are received in the internal cavity of the housing member.

8. The shift lever assembly of claim 7, wherein the housing member defines a projection in the internal cavity; and
   wherein the shaft member defines a shaft internal cavity sized and shaped to correspond to an exterior size and shape of the projection.

9. The shift lever assembly of claim 8, wherein the projection is received in the shaft internal cavity when the plurality of stacked plates in the axially stacked arrangement along with at least a portion of the shaft member are positioned in the internal cavity of the housing member.

10. The shift lever assembly of claim 9, wherein the damping substance is placed on at least one of the projection and a wall of the shaft internal cavity so as to be between the projection and the wall of the shaft internal cavity when the projection is positioned therein.

11. The shift lever of claim 4, wherein each plate of the plurality of stacked plates in the axially stacked arrangement is axially slidable on the shaft member, and wherein the at least one of the stacked plates keyed to the shaft member is rotationally fixed to the shaft member and the at least another one of the stacked plates keyed to the housing member is rotatable relative to the shaft member.

12. The shift lever assembly of claim 1, wherein the damping grease is packed into the cavity about and between each of the stacked plates of the plurality of stacked plates.

13. The shift lever assembly of claim 1, wherein the shaft member is rotationally fixed to the coupling member such that pivotal movement of the shift lever rotates the shaft member relative to the housing member.

* * * * *